United States Patent
Kim et al.

(10) Patent No.: US 11,289,770 B2
(45) Date of Patent: Mar. 29, 2022

(54) SEPARATOR INCLUDING SEPARATOR BASE WITH COATING LAYER INCLUDING STRUCTURAL UNIT DERIVED FROM SULFONIC ACID CONTAINING CATECHOL/PYROGALLOL AND DOPAMINE, MANUFACTURING METHOD THEREFOR, AND LITHIUM-SULFUR BATTERY COMPRISING SAME

(71) Applicant: LG CHEM, LTD., Seoul (KR)

(72) Inventors: Sunjin Kim, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 228 days.

(21) Appl. No.: 16/619,564

(22) PCT Filed: Feb. 19, 2019

(86) PCT No.: PCT/KR2019/001977
§ 371 (c)(1),
(2) Date: Dec. 5, 2019

(87) PCT Pub. No.: WO2019/160393
PCT Pub. Date: Aug. 22, 2019

(65) Prior Publication Data
US 2020/0136112 A1   Apr. 30, 2020

(30) Foreign Application Priority Data
Feb. 19, 2018   (KR) .................. 10-2018-0019149

(51) Int. Cl.
*H01M 50/44*   (2021.01)
*H01M 10/0525*   (2010.01)
(Continued)

(52) U.S. Cl.
CPC ....... *H01M 50/44* (2021.01); *H01M 10/0525* (2013.01); *H01M 50/411* (2021.01);
(Continued)

(58) Field of Classification Search
CPC ..... H01M 50/44; H01M 50/46; H01M 50/411
(Continued)

(56) References Cited

U.S. PATENT DOCUMENTS

2015/0010709 A1   1/2015  Beckford et al.
2015/0056517 A1   2/2015  Zhou et al.
(Continued)

FOREIGN PATENT DOCUMENTS

CN   103408975 A   11/2013
CN   104051695 A   9/2014
(Continued)

OTHER PUBLICATIONS

Ryou et al, Excellent Cycle Life of Lithium-Metal Anodes in Lithium-Ion Batteries with Mussel-Inspired Polydopamine-Coated Separators, 2012, Advanced Energy Materials, 2, 645-650 (Year: 2012).*

(Continued)

*Primary Examiner* — Sean P Cullen
(74) *Attorney, Agent, or Firm* — Birch, Stewart, Kolasch & Birch, LLP

(57) ABSTRACT

A separator for a lithium-sulfur battery including a separator base; and a coating layer present on one or more surface of the separator base, wherein the coating layer includes a structural unit (A) derived from one or more compound including (i) one or more group selected from the group consisting of a catechol group and a pyrogallol group, and (ii) one or more sulfonic acid group; and a structural unit (B) derived from dopamine, and wherein the coating layer includes a sulfonic acid anion group. Also, a lithium-sulfur (Continued)

POLYDOPAMINE + SULFONIC ACID ANION COATING LAYER

SEPARATOR BASE battery manufactured using the same, and a method for preparing the separator.

10 Claims, 5 Drawing Sheets

(51) Int. Cl.
    *H01M 50/411*     (2021.01)
    *H01M 50/46*     (2021.01)
    *H01M 4/02*     (2006.01)

(52) U.S. Cl.
    CPC ...... *H01M 50/46* (2021.01); *H01M 2004/027* (2013.01); *H01M 2004/028* (2013.01)

(58) Field of Classification Search
    USPC .......................................................... 429/144
    See application file for complete search history.

(56) References Cited

U.S. PATENT DOCUMENTS

| | | |
|---|---|---|
| 2015/0361218 A1 | 12/2015 | Lee et al. |
| 2016/0218342 A1 | 7/2016 | Xiao et al. |
| 2018/0198156 A1 | 7/2018 | Lee et al. |

FOREIGN PATENT DOCUMENTS

| | | | |
|---|---|---|---|
| CN | 105977433 A | | 9/2016 |
| CN | 106803561 A | * | 6/2017 |
| CN | 106887556 A | * | 6/2017 |
| CN | 106935773 A | | 7/2017 |
| CN | 106953051 A | * | 7/2017 |
| JP | 2017-183051 A | | 10/2017 |
| KR | 10-1327891 B1 | | 11/2013 |
| KR | 10-2013-0141234 A | | 12/2013 |
| KR | 10-1396270 B1 | | 5/2014 |
| KR | 10-2014-0136807 A | | 12/2014 |
| KR | 10-2015-0144846 A | | 12/2015 |
| KR | 10-2016-0092862 A | | 8/2016 |
| KR | 10-2017-0009280 A | | 1/2017 |
| KR | 10-2017-0090294 A | | 8/2017 |
| KR | 10-2017-0106125 A | | 9/2017 |
| WO | WO 2017/131377 A1 | | 8/2017 |

OTHER PUBLICATIONS

International Search Repot (PCT/ISA/210) issued in PCT/KR2019/001977, dated May 15, 2019.

Ma et al., "Hichly conductive, sulfonated, UV-crosslinked separators for Li—S batteries", Chem. Mater., 2016, vol. 28, No. 14, pp. 5147-5154, Total 23 pages.

Zeng, et al., "High performance lithium-sulfur batteries with a permselective sulfonated acetylene black modified separator", J. Mater. Chem. A, 2016, vol. 4, pp. 12319-12327, Total 11 pages.

Extended European Search Report for European Application No. 19754162.6, dated Apr. 29, 2020.

Xiang et al., "Advanced Separators for Lithium-Ion and Lithium-Sulfur Batteries: A Review of Recent Progress," ChemSusChem, vol. 9, Sep. 26, 2016, pp. 3023-3039.

\* cited by examiner

SEPARATOR INCLUDING SEPARATOR BASE WITH COATING LAYER INCLUDING STRUCTURAL UNIT DERIVED FROM SULFONIC ACID CONTAINING CATECHOL/PYROGALLOL AND DOPAMINE, MANUFACTURING METHOD THEREFOR, AND LITHIUM-SULFUR BATTERY COMPRISING SAME

TECHNICAL FIELD

The present application claims the benefit of priority based on Korean Patent Application No. 10-2018-0019149, filed on Feb. 19, 2018, all the contents of which are incorporated herein by reference.

The present invention relates to a separator for a lithium-sulfur battery, a method for preparing the same, and a lithium-sulfur battery comprising the same.

BACKGROUND ART

As electronic goods, electronic devices, communication devices and the like have rapidly become smaller and lighter recently, and necessity of electric vehicles has highly emerged regarding environmental problems, demands for improving performance of secondary batteries used as a power source of these goods have greatly increased. Among these, lithium secondary batteries have received considerable attention as a high-performance battery due to their high energy density and high standard electrode potential.

Particularly, lithium-sulfur (Li—S) batteries are a secondary battery using a sulfur series material having sulfur-sulfur (S—S) bonds as a positive electrode active material, and using lithium metal as a negative electrode active material. Sulfur, a main material of a positive electrode active material, has advantages of being very abundant in resources, having no toxicity and having a low atomic weight. In addition, a lithium-sulfur battery has theoretical discharge capacity of 1,675 mAh/g-sulfur and theoretical energy density of 2,600 Wh/kg, which is very high compared to theoretical energy density of other battery systems (Ni-MH battery: 450 Wh/kg, Li—FeS battery: 480 Wh/kg, Li—MnO$_2$ battery: 1,000 Wh/kg, Na—S battery: 800 Wh/kg) currently studied, and therefore, is known to be a most promising battery among batteries that have been developed so far.

During a discharge reaction of a lithium-sulfur battery, an oxidation reaction of lithium occurs in a negative electrode (anode), and a reduction reaction of sulfur occurs in a positive electrode (cathode). The lithium-sulfur battery produces lithium polysulfide (Li$_2$S$_x$, x=4 to 8) during discharge, and this is continuously eluted during discharge due to high solubility for an organic electrolyte, which causes a rapid capacity decrease in a positive electrode, and produces insoluble Li$_2$S and Li$_2$S$_2$ in a negative electrode causing a problem of being accumulated on the negative electrode surface and interface with a separator, and the like. In addition, the lithium polysulfide causes a shuttle reaction during a charging process, thereby significantly reducing charge and discharge efficiency.

In order to resolve such problems, methods of adding an additive having a sulfur-adsorbing property have been proposed, however, a deterioration problem, newly producing additional battery side reactions, has occurred. In addition, methods of adding a metal chalcogenide, alumina or the like or coating the surface with oxycarbonate and the like have been proposed in order to delay an outflow of a positive electrode active material, that is, sulfur, however, such methods either have the sulfur lost during a treatment process or are complicated, and also limit the amount of sulfur, an active material, to introduce (that is, loading amount).

Accordingly, problems of lithium polysulfide are recognized as a priority issue in this field for commercialization of a lithium-sulfur battery.

PRIOR ART DOCUMENTS

[Patent Document]
Korean Patent Application Laid-Open Publication No. 10-2013-0141234

DISCLOSURE

Technical Problem

The present invention has been made in view of the problems of existing technologies as above, and an aspect of the present invention provides a separator for a lithium-sulfur battery capable of resolving problems caused by lithium polysulfide, and a method for preparing the same.

Another aspect of the present invention provides a lithium-sulfur battery having improved charge and discharge efficiency and lifetime properties by being provided with the separator.

Technical Solution

According to an aspect of the present invention, there is provided a separator for a lithium-sulfur battery comprising a separator base; and a coating layer present on one or more surfaces of the separator base, wherein the coating layer comprises a structural unit (A) derived from one or more compound comprising (i) one or more group selected from the group consisting of a catechol group and a pyrogallol group, and (ii) one or more sulfonic acid group; and a structural unit (B) derived from dopamine, and wherein the coating layer comprises a sulfonic acid anion group.

According to another aspect of present invention, there is provided a method for preparing a separator for a lithium-sulfur battery comprising:

preparing a coating composition comprising:

(a) one or more compound comprising (i) one or more group selected from the group consisting of a catechol group and a pyrogallol group, and (ii) one or more sulfonic acid group; and (b) dopamine; and coating the coating composition on one or more surface of a separator base.

According to still another aspect of present invention, there is provided a lithium-sulfur battery comprising a positive electrode; a negative electrode; a separator provided between the positive electrode and the negative electrode; and an electrolyte, wherein the separator is the separator of the present invention.

Advantageous Effects

A separator for a lithium-sulfur battery of the present invention provides an effect of resolving problems caused by lithium polysulfide by introducing a sulfonic acid anion group (SO$_3^-$) on the separator surface to give a negative charge.

In addition, the present invention provides a method for preparing a separator for a lithium-sulfur battery capable of readily introducing a sulfonic acid anion group ($SO_3^-$) on the separator surface.

In addition, the present invention provides a lithium-sulfur battery having improved charge and discharge efficiency and lifetime properties by being provided with the separator.

BEST MODE

Hereinafter, the present invention will be described in detail.

The present invention relates to a separator for a lithium-sulfur battery comprising a separator base; and a coating layer present on one or more surfaces of the separator base, wherein the coating layer comprises a structural unit (A) derived from one or more compound comprising (i) one or more group selected from the group consisting of a catechol group and a pyrogallol group, and (ii) one or more sulfonic acid group; and a structural unit (B) derived from dopamine, and wherein the coating layer comprises a sulfonic acid anion group.

Figure 1:
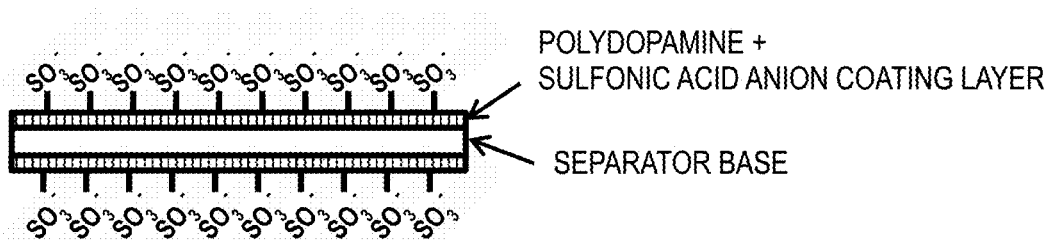
FIG. 1 is a cross-sectional view mimetically illustrating a structure of a separator for a lithium-sulfur battery according to one embodiment of the present invention.

As illustrated in FIG. 1, the separator for a lithium-sulfur battery of the present invention has a coating layer formed comprising polydopamine and a sulfonic acid anion group (—$SO_3^-$) on the surface.

Figure 2:
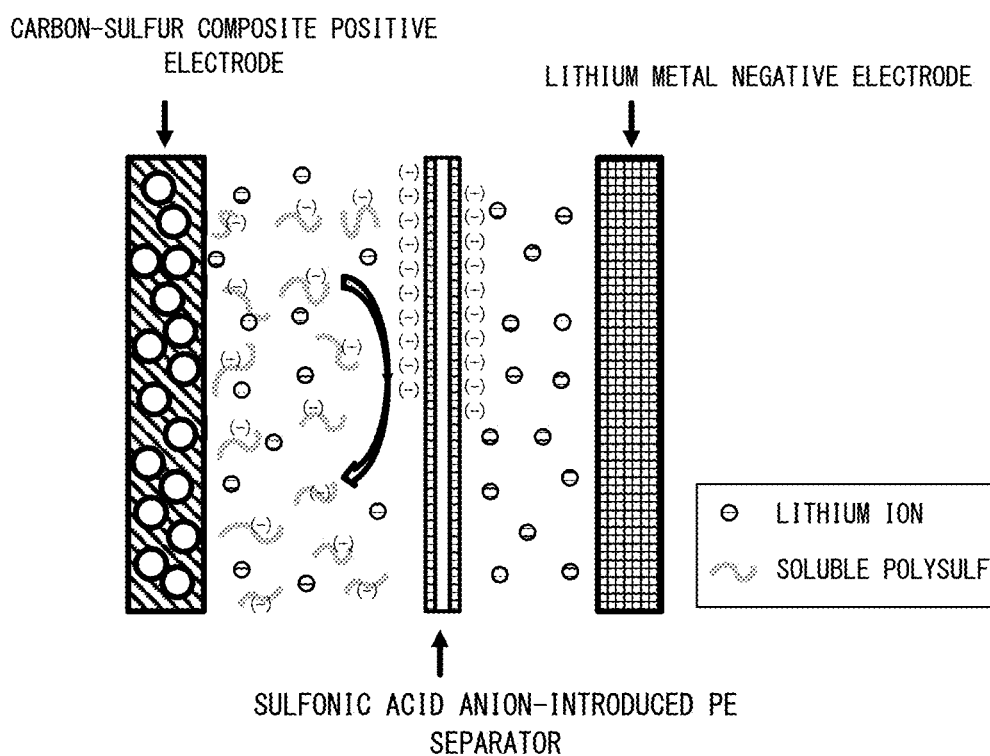
FIG. 2 is a cross-sectional view mimetically illustrating a working mechanism of a separator for a lithium-sulfur battery according to one embodiment of the present invention.

Since the coating layer is negatively charged, it pushes and thereby blocks negatively charged soluble polysulfide generated in a positive electrode and moving toward a negative electrode by a repulsive force as illustrated in FIG. 2. Therefore, problems caused by polysulfide are resolved.

In the coating layer, a ratio of a total molar number of the structural unit (A) to a molar number of the structural unit (B) may be from 1:0.1 to 5, more preferably from 1:0.5 to 2, and even more preferably from 1:0.7 to 1.3.

The coating layer may be formed by polymerization through an oxidation reaction between the catechol or pyrogallol group comprised in structural unit (A) and catechol group comprised in structural unit (B).

The one or more compound comprising (i) one or more group selected from the group consisting of a catechol group and a pyrogallol group, and (ii) one or more sulfonic acid group may be selected from the group consisting of, for example, pyrogallol red, pyrocatechol violet, catechol-4-sulfonic acid, 1,2-dihydroxybenzene-3,5-disulfonic acid, 3,4-dihydroxybenzenesulfonic acid, 2,3-dihydroxynaphthalene-6-sulfonic acid and the like, but are not limited thereto.

Structures of the pyrogallol red and the pyrocatechol violet are represented by the following Chemical Formulae 1 and 2, respectively:

[Chemical Formula 1]

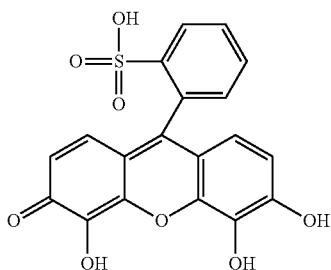

[Chemical Formula 2]

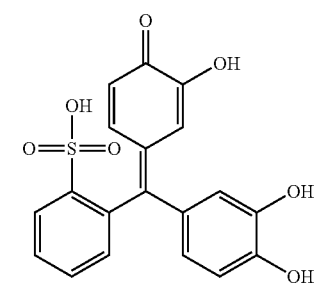

The separator base is not particularly limited, and those known in the art may be used without limit. For example, films formed with one or more compound selected from the group consisting of polyolefin, polyester such as polyethylene terephthalate, polybutylene terephthalate, polyacetal, polyamide, polycarbonate, polyimide, polyetheretherketone, polyethersulfone, polyphenylene oxide, polyphenylene sulfide, polyethylene naphthalene and the like may be used.

The present invention also relates to a method for preparing a separator for a lithium-sulfur battery comprising:

preparing a coating composition comprising:

(a) one or more compound comprising (i) one or more group selected from the group consisting of a catechol group and a pyrogallol group, and (ii) one or more sulfonic acid group; and (b) dopamine; and coating the coating composition on one or more surface of a separator base.

Regarding the preparation method, descriptions on the separator for a lithium-sulfur battery provided above may all be applied.

In the coating composition, a ratio of a total molar number of (a) to a molar number of (b) may be from 1:0.1 to 5, more preferably from 1:0.5 to 2, and even more preferably from 1:0.7 to 1.3.

The coating composition may further include a solvent, and in this case, a total molar concentration of (a) may be from 1 mM to 500 mM.

As the solvent, those capable of dissolving the above-mentioned components may be used, and specifically, one or more selected from among a buffer solution; a C1 to C5 alcohol such as methanol or ethanol; water and the like may be used. As the water, distilled water may be preferably used.

The solvent may have a pH of 8 to 10 for polymerization of the dopamine.

The buffer solution may be prepared using, for example, tris HCl and/or tris base. The buffer solution may have its pH adjusted to 8 to 10, and without being limited thereto, may have its pH adjusted to a pH at which the dopamine is able to produce an autoxidation polymerization reaction. As the buffer solution concentration and the pH are higher, the coating rate and/or the coating thickness may increase. For example, the mixture solution may have a concentration of 1 mM to 20 mM, and a pH of 8.5.

As for the solvent, a total molar concentration of each of the components other than water may be from 1 mM to 1 M.

The coating composition may further include an oxidizer for facilitating oxidation. As the oxidizer, those known in the art may be used without limit, and for example, $NaIO_4$, piperidine and the like may be used.

The coating composition may be prepared by mixing (a) and (b).

The coating method is not particularly limited, and methods known in the art may be used.

When the coating is performed by dip coating, dipping time of the separator base may be from 5 minutes to 60 minutes and more preferably from 15 minutes to 30 minutes when using pyrogallol red.

When using pyrocatechol violet, dipping time of the separator base may be from 0.5 hours to 8 hours and more preferably from 50 minutes to 120 minutes.

The dipping time in the present invention may be shortened by an addition of the oxidizer.

Pyrogallol red has a high reaction rate, and when the coating is performed for a long period of time outside the above-mentioned coating time range, performance may decline.

Meanwhile, in pyrocatechol violet, the catechol functional group has a lower reaction rate than the gallol functional group, and therefore, the coating needs to be performed for a relatively long period of time, and when the coating is performed for a shorter period of time than the above-described range, performance declines.

The present invention also relates to a lithium-sulfur battery including a positive electrode; a negative electrode; a separator provided between the positive electrode and the negative electrode; and an electrolyte, wherein the separator is the separator of the present invention described above.

Hereinafter, constitutions of the lithium-sulfur battery of the present invention will be described. The following lithium-sulfur battery constitutions are described as an example for implementing the present invention, and do not limit the present invention.

As the positive electrode of the present invention, those known in the art may be used. Particularly, a sulfur-carbon composite may be preferably used.

As the negative electrode of the battery of the present invention, negative electrodes known in the art as a negative electrode including lithium metal or a lithium alloy as a negative electrode active material may be used without limit.

As the lithium alloy as the negative electrode active material, alloys of lithium and metals selected from the group consisting of Na, K, Rb, Cs, Fr, Be, Mg, Ca, Sr, Ba, Ra, Al, Sn and the like may be used.

As the separator provided between the positive electrode and the negative electrode, the separator of the present invention may be used.

As the electrolyte, those known in the art may be used, and for example, electrolytes having a form including a lithium salt and an organic solvent may be used. The electrolyte may have a form of being impregnated into the negative electrode, the positive electrode and the separator.

As the organic solvent included in the electrolyte, for example, single solvent or mixed organic solvents of two or more may be used. When using the mixed organic solvents of two or more, one or more solvents selected from two or more groups among a weak polar solvent group, a strong polar solvent group and a lithium metal protecting solvent group may be used. The weak polar solvent is defined by a solvent having a dielectric constant of less than 15 capable of dissolving a sulfur element among aryl compounds, bicyclic ether, and non-cyclic carbonate, the strong polar solvent is defined by a solvent having a dielectric constant of greater than 15 capable of dissolving lithium polysulfide among bicyclic carbonate, sulfoxide compounds, lactone compounds, ketone compounds, ester compounds, sulfate compounds and sulfite compounds, and a lithium metal protecting solvent is defined by a solvent having charge and discharge cycle efficiency of 50% or greater forming a stable solid electrolyte interface (SEI) on lithium metal such as saturated ether compounds, unsaturated ether compounds, heterocyclic compounds including N, O, S or a combination thereof.

Specific examples of the weak polar solvent may include xylene, dimethoxyethane, 2-methyltetrahydrofuran, diethyl carbonate, dimethyl carbonate, toluene, dimethyl ether, diethyl ether, diglyme, tetraglyme and the like, but are not limited thereto.

Specific examples of the strong polar solvent may include hexamethyl phosphoric triamide, γ-butyrolactone, acetonitrile, ethylene carbonate, propylene carbonate, N-methyl pyrrolidone, 3-methyl-2-oxazolidone, dimethylformamide, sulfolane, dimethylacetamide, dimethyl sulfoxide, dimethyl sulfate, ethylene glycol diacetate, dimethyl sulfite, ethylene glycol sulfite and the like, but are not limited thereto.

Specific examples of the lithium metal protecting solvent may include tetrahydrofuran, ethylene oxide, dioxolane, 3,5-dimethylisoxazole, furan, 2-methylfuran, 1,4-dioxane, 4-methyldioxolane and the like, but are not limited thereto.

The battery may be formed using technologies known in the art except for characteristic technologies of the present invention described above.

Hereinafter, preferred examples are provided in order to illuminate the present invention, however, the following examples are for illustrative purposes only, and it is obvious to those skilled in the art that various modifications and changes may be made within the category and the scope of technological ideas of the present invention, and such modifications and changes also fall within the scope of the attached claims.

EXAMPLE 1

Preparation of Separator for Lithium-Sulfur Battery

As a separator base, a polyethylene (porosity 50%) film having a thickness of 20 μm was prepared.

TRIZMA® HCl and TRIZMA® base manufactured by Sigma-Aldrich were purchased and dissolved in 2.21 g/L, 4.36 g/L, respectively, to prepare a buffer solution of 50 mM and pH 8.5, and the buffer solution was diluted to 10 mM using distilled water to prepare a tris butter solution.

To the tris buffer solution, pyrogallol red and dopamine were added in a molar ratio of 1:1 so that the pyrogallol red has a molar concentration of 10 mM, and a coating composition was prepared therefrom.

The separator base was dipped for 20 minutes through dip coating while stirring the coating composition at 80 rpm using a shaker to prepare a separator.

EXAMPLE 2

Preparation of Separator for Lithium-Sulfur Battery

A separator was prepared in the same manner as in Example 1 except that the pyrogallol red and the dopamine were added in a molar ratio of 1:0.5.

EXAMPLE 3

Preparation of Separator for Lithium-Sulfur Battery

A separator was prepared in the same manner as in Example 1 except that the pyrogallol red and the dopamine were added in a molar ratio of 1:2.

EXAMPLE 4

Preparation of Separator for Lithium-Sulfur Battery

A separator was prepared in the same manner as in Example 1 except that pyrocatechol violet was used instead of pyrogallol red.

EXAMPLE 5

Preparation of Separator for Lithium-Sulfur Battery

A separator was prepared in the same manner as in Example 1 except that pyrocatechol violet was used instead of pyrogallol red, and the dip coating was performed for 60 minutes.

EXAMPLE 6

Preparation of Separator for Lithium-Sulfur Battery

A separator was prepared in the same manner as in Example 1 except that the dip coating was performed for 60 minutes instead of 20 minutes.

COMPARATIVE EXAMPLE 1

PE Separator

A commercially available polyethylene (porosity 50%) separator having a thickness of 20 μm was prepared as a separator of Comparative Example 1.

EXAMPLE 7 TO 12 and COMPARATIVE EXAMPLE 2

Manufacture of Battery

A positive electrode a having a composition of 85% by weight of a positive electrode active material prepared by mixing sulfur and carbon nanotubes (CNT) in a weight ratio of 7:3, 5% by weight of carbon nanofibers as a conductor, and 10% by weight of a binder was added to D.I water to prepare positive electrode slurry, and the slurry was coated on an aluminum current collector to prepare a positive electrode.

Using the positive electrode; lithium foil having a thickness of approximately 35 μm as a negative electrode; an electrolyte liquid obtained by adding 1 M LiTFSI and 1% by weight $LiNO_3$ to an ether-based solvent; and each of the separators prepared in Examples 1 to 6 and Comparative Example 1 as a separator, each of lithium-sulfur batteries of Examples 7 to 12 and Comparative Example 2 was manufactured.

TEST EXAMPLE 1

Evaluation on Lifetime Properties of Lithium-Sulfur Battery (1) Test Details

For each of the lithium-sulfur batteries manufactured in Examples 7 to 12 and Comparative Example 2, a charge and discharge cycle was repeated to measure a lifetime of the battery. Specifically, capacity of each of the batteries for each cycle was measured while repeating charge/discharge at 0.1 C/0.1 C for the first 3 cycles, repeating charge/discharge at 0.2 C/0.2 C for the next 3 cycles, and repeating charge/discharge at 0.3 C/0.5 C for cycles after that.

Figure 3:
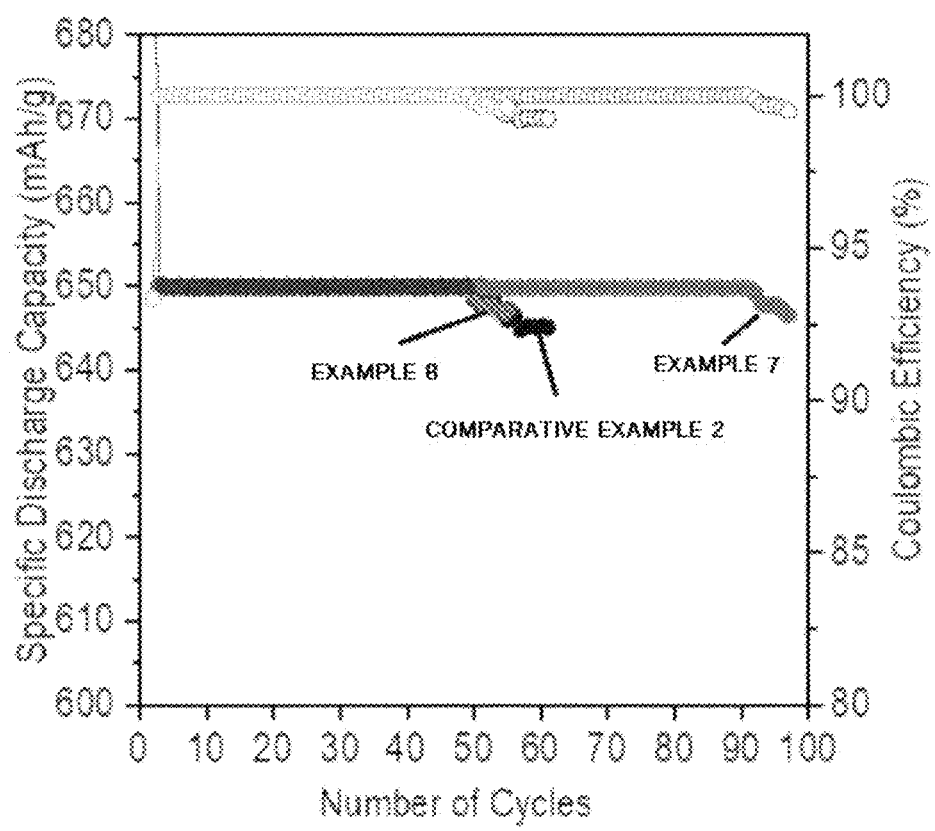
FIG. 3 is a graph showing lifetime properties of lithium-sulfur batteries manufactured in Examples 7 and 8 and Comparative Example 2.
Figure 4:
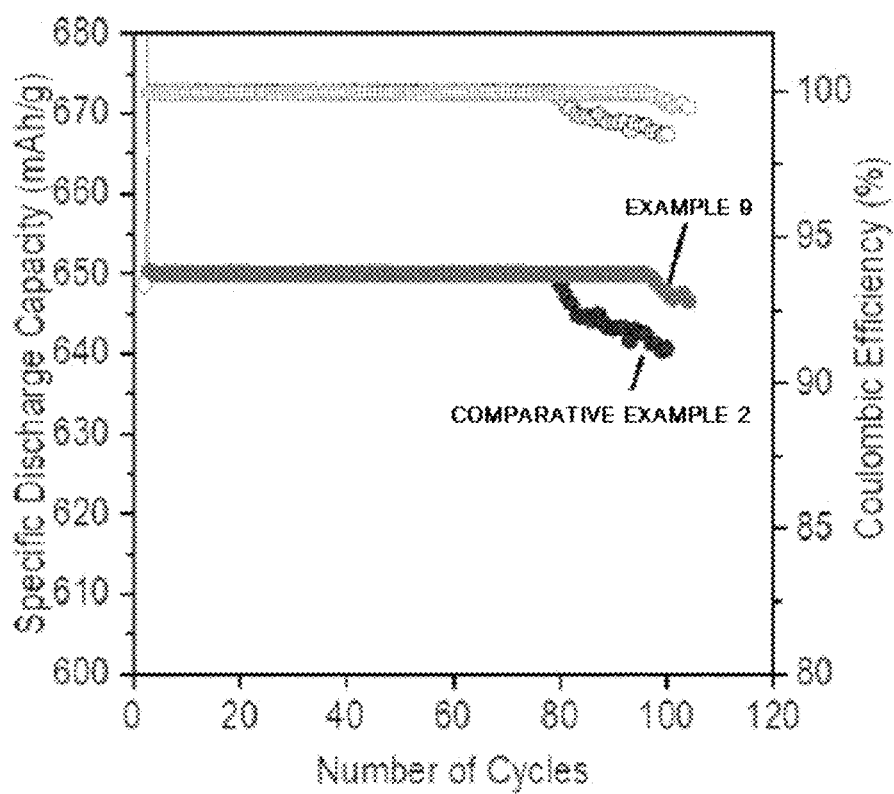
FIG. 4 is a graph showing lifetime properties of lithium-sulfur batteries manufactured in Example 9 and Comparative Example 2.
Figure 5:
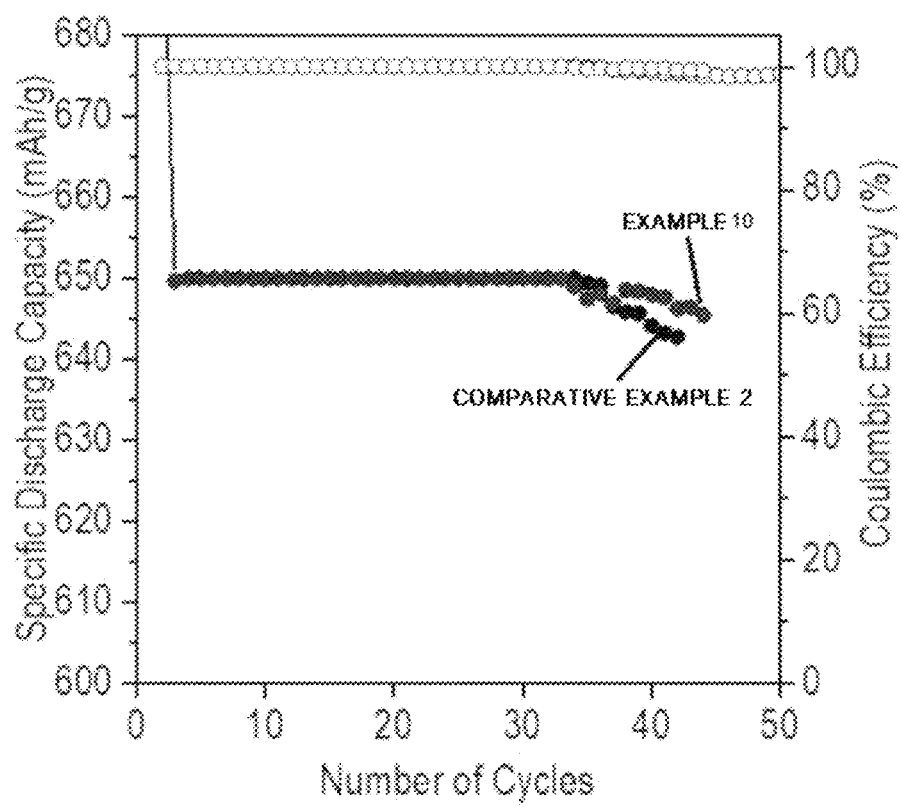
FIG. 5 is a graph showing lifetime properties of lithium-sulfur batteries manufactured in Example 10 and Comparative Example 2.

For the batteries of Examples 7 to 10 and the battery of Comparative Example 2, lifetime properties were evaluated employing capacity of 650 mAh/g as a cut, and the results are shown in FIGS. 3 to 5.

Figure 6:
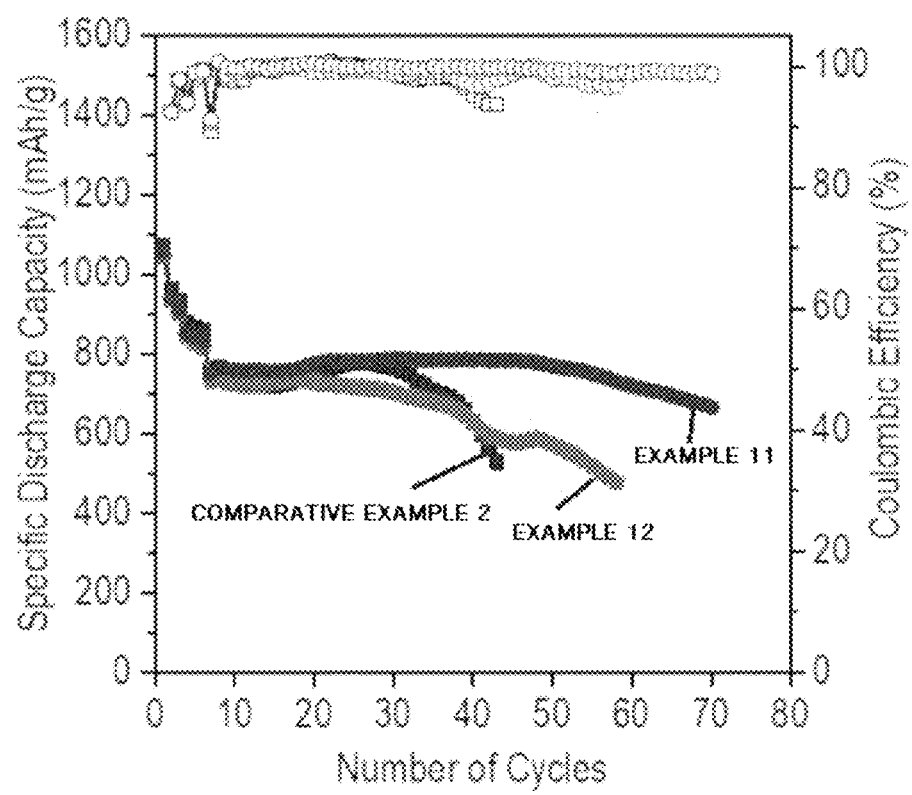
FIG. 6 is a graph showing lifetime properties of lithium-sulfur batteries manufactured in Examples 11 and 12 and Comparative Example 2.

For the batteries of Examples 11 and 12 and the battery of Comparative Example 2, lifetime properties were evaluated employing a voltage of 1.8 V to 2.5 V as a cut, and the results are shown in FIG. 6.

(2) Test Results

Based on the test results shown in FIG. 3 to FIG. 6, the lithium-sulfur batteries of Examples 7 to 12 using the separator of the present invention exhibited excellent lifetime properties compared to the lithium-sulfur battery of Comparative Example 2 using a commercially available PE separator.

Specifically, as shown in FIG. 5, the lithium-sulfur battery of Example 10 using the separator (Example 4, coating for 20 minutes) prepared using pyrocatechol violet exhibited inferior lifetime properties compared to the batteries using pyrogallol red (Examples 7 to 9), although the lifetime properties were more superior than the lithium-sulfur battery of Comparative Example 2. Such a result is considered to be due to the fact that the catechol functional group has a lower reaction rate than the gallol functional group, and therefore, when coating for the same 20 minutes, relatively low lifetime performance was obtained compared to the batteries using the separator using pyrogallol red (Examples 7 to 9).

However, as shown in FIG. 6, the lifetime was more enhanced when coating for 60 minutes. Meanwhile, when using pyrogallol red, coating for 60 minutes resulted in performance decline compared to when coating for 20 minutes, although the performance was more superior than Comparative Example 2.

For reference, the battery of Comparative Example 2 shown in FIG. 3 and the battery of Comparative Example 2 shown in FIG. 4 exhibited different lifetime properties since loading of the electrode used in the test was different.

The invention claimed is:

1. A separator for a lithium-sulfur battery comprising:
   a separator base; and
   a coating layer present on one or more surface of the separator base,
   wherein the coating layer comprises:

a structural unit (A) selected from the group consisting of pyrogallol red, pyrocatechol violet, catechol-4-sulfonic acid, 1,2-dihydroxybenzene-3,5-disulfonic acid, 3,4-dihydroxybenzenesulfonic acid and 2,3-dihydroxynaphthalene-6-sulfonic acid; and a structural unit (B) consisting of dopamine, and wherein the coating layer comprises a sulfonic acid anion group.

2. The separator for a lithium-sulfur battery of claim 1, wherein, in the coating layer, a ratio of a total molar number of structural unit (A) to a molar number of structural unit (B) is from 1:0.1 to 1:5.

3. The separator for a lithium-sulfur battery of claim 1, wherein the separator base is a film formed with one or more selected from the group consisting of polyolefin, polyester, polyacetal, polyamide, polycarbonate, polyimide, polyetheretherketone, polyethersulfone, polyphenylene oxide, polyphenylene sulfide and polyethylene naphthalene.

4. A lithium-sulfur battery comprising:
a positive electrode;
a negative electrode;
a separator provided between the positive electrode and the negative electrode; and
an electrolyte,
wherein the separator is the separator of claim 1.

5. A method for preparing a separator for a lithium-sulfur battery comprising:
preparing a coating composition comprising:
(a) a compound selected from the group consisting of pyrogallol red, pyrocatechol violet, catechol-4-sulfonic acid, 1,2-dihydroxybenzene-3,5-disulfonic acid, 3,4-dihydroxybenzenesulfonic acid and 2,3-dihydroxynaphthalene-6-sulfonic acid; and
(b) dopamine; and
coating the coating composition on one or more surface of a separator base.

6. The method for preparing a separator for a lithium-sulfur battery of claim 5, wherein the coating composition further comprises an oxidizer.

7. The method for preparing a separator for a lithium-sulfur battery of claim 5, wherein the coating composition is prepared by mixing (a) and (b).

8. The method for preparing a separator for a lithium-sulfur battery of claim 5, wherein, in the coating composition, a ratio of a total molar number of (a) to a molar number of (b) is from 1:0.1 to 1:5.

9. The method for preparing a separator for a lithium-sulfur battery of claim 8, wherein the coating composition further comprises a solvent, and a total molar concentration of (a) is from 1 mM to 500 mM.

10. The method for preparing a separator for a lithium-sulfur battery of claim 9, wherein the solvent comprises one or more selected from the group consisting of a buffer solution, a C1 to C5 alcohol and water, and wherein the solvent has a pH of 8 to 10.

* * * * *